United States Patent
Musa et al.

(10) Patent No.: US 6,699,929 B2
(45) Date of Patent: Mar. 2, 2004

(54) DIE ATTACH ADHESIVES WITH VINYL ETHER AND CARBAMATE OR UREA FUNCTIONALITY

(75) Inventors: Osama M. Musa, Hillsborough, NJ (US); Donald E. Herr, Flemington, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 351 days.

(21) Appl. No.: 09/927,242

(22) Filed: Aug. 10, 2001

(65) Prior Publication Data

US 2002/0032257 A1 Mar. 14, 2002

Related U.S. Application Data

(63) Continuation of application No. 09/573,303, filed on May 18, 2000.

(51) Int. Cl.[7] .................................................. C08L 77/00
(52) U.S. Cl. ...................... 524/515; 524/439; 524/440; 526/262
(58) Field of Search .................. 524/515, 439, 524/440; 526/262

(56) References Cited

U.S. PATENT DOCUMENTS

| | | | |
|---|---|---|---|
| 4,486,582 A | 12/1984 | Heffner, Jr. ................. | 526/301 |
| 4,543,397 A | 9/1985 | Woods et al. ................ | 525/455 |
| 4,640,849 A | 2/1987 | Woods et al. ................ | 427/54.1 |
| 4,732,956 A | 3/1988 | Woods et al. ................ | 526/260 |
| 4,749,807 A | 6/1988 | Lapin et al. .................. | 560/91 |
| 4,751,273 A | 6/1988 | Lapin et al. .................. | 525/455 |
| 4,775,732 A | 10/1988 | Lapin et al. .................. | 528/49 |
| 5,019,629 A | 5/1991 | Woods et al. ................ | 525/312 |
| 5,084,490 A | 1/1992 | McArdle et al. ............. | 522/181 |
| 5,183,946 A | 2/1993 | Liu et al. ..................... | 568/670 |
| 5,334,456 A | 8/1994 | Noren et al. ................. | 428/431 |
| 5,491,178 A | 2/1996 | Swedo et al. ................. | 522/74 |
| 5,495,029 A | 2/1996 | Steinmann et al. .......... | 549/645 |
| 5,514,727 A | 5/1996 | Green et al. .................. | 522/15 |
| 5,516,455 A | 5/1996 | Jacobine et al. ........ | 252/299.01 |
| 5,539,014 A | 7/1996 | Swedo et al. ................. | 522/91 |
| 5,633,411 A | 5/1997 | Woods et al. ................ | 568/654 |
| 5,708,129 A | 1/1998 | Nguyen et al. ............. | 528/362 |
| 5,789,757 A | 8/1998 | Husson, Jr. et al. .... | 252/183.11 |
| 6,034,194 A | 3/2000 | Dershem et al. ............ | 526/262 |
| 6,034,195 A | 3/2000 | Dershem et al. ............ | 526/262 |
| 6,121,358 A | 9/2000 | Dershem et al. ............ | 524/439 |

FOREIGN PATENT DOCUMENTS

| | | |
|---|---|---|
| WO | WO 00/0808 | 2/2000 |
| WO | WO 00/37403 | 6/2000 |

OTHER PUBLICATIONS

"Co–Polymerization of Maleimides and Vinyl Ethers: A Structural Study" by P. Kohli, A. B. Scranton, and G.J. Blanchard; *Macromolecules* 1998, 31, 5681–5689.

Primary Examiner—Edward J. Cain
(74) Attorney, Agent, or Firm—Jane E. Gennaro

(57) ABSTRACT

Compounds with both vinyl ether and carbamate, thiocarbamate or urea functionality are suitable for use in microelectronics applications and show enhanced adhesive strength compared to compounds that do not contain carbamate, thiocarbamate or urea functionality.

9 Claims, No Drawings

DIE ATTACH ADHESIVES WITH VINYL ETHER AND CARBAMATE OR UREA FUNCTIONALITY

This is a continuation of U.S. Ser. No. 09/573,303 filed May 18, 2000.

FIELD OF THE INVENTION

This invention relates to die attach adhesives containing resins that contain both vinyl ether and either carbamate, thiocarbamate or urea functionality.

BACKGROUND OF THE INVENTION

Adhesive compositions, particularly conductive adhesives, are used for a variety of purposes in the fabrication and assembly of semiconductor packages and microelectronic devices. The more prominent uses are the bonding of integrated circuit chips to lead frames or other substrates, and the bonding of circuit packages or assemblies to printed wire boards.

There exist electron acceptor/donor adhesives that contain vinyl ethers as the donor compounds for use in low modulus adhesives, particularly in fast-cure adhesives for die attach applications. However, die attach adhesives containing commercially available vinyl ethers frequently suffer from poor adhesion, resin bleed and voiding due to the volatility and non-polar nature of these commercial vinyl ethers. Thus, there is a need for improved die attach adhesives utilizing vinyl ethers containing polar functionality in order to address these performance issues.

SUMMARY OF THE INVENTION

This invention relates to die attach adhesive compositions containing resins that have vinyl ether and polar functionality, such as a carbamate, thiocarbamate or urea functionality, on a molecular (small molecule) or polymeric entity. The die attach adhesive compositions may contain a curing agent and one or more fillers.

The molecular or polymeric group may be a branched, linear, or cyclic alkane, a siloxane, a polysiloxane, a $C_1$ to $C_4$ alkoxy-terminated siloxane or polysiloxane, a polyether, a polyester, a polyurethane, a poly(butadiene), or an aromatic, polyaromatic, or heteroaromatic group.

In another embodiment, this invention is a die attach adhesive composition comprising one or more of the polar vinyl ether compounds and one or more co-polymerizable electron acceptor compounds, and a curing agent and one or more fillers. Suitable electron acceptor compounds for copolymerization are fumarates and maleates, for example, dioctyl maleate, dibutyl maleate, dioctyl fumarate, dibutyl fumarate. Resins or compounds containing acrylate and maleimide functionality are other suitable electron acceptor materials.

DETAILED DESCRIPTION OF THE INVENTION

The polar vinyl ether compounds used in the die attach adhesive compositions of this invention will be compounds having a structure as depicted here:

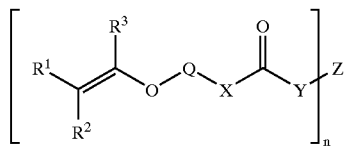

in which n is 1 to 6, and preferably 1 to 3;

$R^1$, $R^2$, and $R^3$ are hydrogen, methyl or ethyl, preferably two of $R^1$, $R^2$, and $R^3$ are hydrogen and one is methyl, and more preferably all are hydrogen;

Q is a linear or branched chain alkyl or cycloalkyl having 1 to 12 carbon atoms; a linear or branched chain alkylenoxy having 1 to 12 carbon atoms, or an aromatic or heteroaromatic ring or fused ring having 3 to 10 carbon atoms within the ring structure, in which the heteroatoms may be N, O, or S;

X and Y are independently O, $NR^1$, or S, in which $R^1$ is as described above, with the proviso that both X and Y cannot be oxygen or sulfur, and Z is a branched or linear alkane, which may contain cyclic moieties, a siloxane, a polysiloxane, a $C_1$ to $C_4$ alkoxy-terminated siloxane or polysiloxane, a polyether, a polyester, a polyurethane, a poly(butadiene), or an aromatic, polyaromatic, or heteroaromatic group.

Starting materials for preparation as the Z group are commercially available from a number of sources; for example, aromatic and polyaromatic materials may be obtained from BASF or Bayer; siloxanes and polysiloxanes from Gelest; polyethers from BASF; polyesters from Uniqema or Bayer; poly(butadiene)s from Elf-Atochem; polyurethanes from Bayer or BASF; and the branched or linear alkanes from Uniqema. Some of these sources will have available Z materials already functionalized for reaction with a co-reactive functionality with the starting material containing the vinyl ether group; in other cases, the practitioner will need to functionalize the materials in preparation for reaction with the vinyl ether starting material.

The exact composition or molecular weight of Z is not critical to the invention and can range widely depending on the requirements of the end use for the electron donor compound. The composition of Z can be chosen to give specific material properties in a final formulation, such as, rheological properties, hydrophilic or hydrophobic properties, toughness, strength, or flexibility. For example, a low level of crosslinking and free rotation about polymeric bonds will impart flexibility to a compound, and the presence of siloxane moieties will impart hydrophobicity and flexibility. The molecular weight and chain length will affect viscosity, the higher the molecular weight and the longer the chain length, the higher the viscosity.

These polar vinyl ether compounds can be prepared by various synthetic routes as devised by those skilled in the art. One suitable method is through a condensation or addition reaction between a vinyl ether terminated alcohol, amine or thiol and a co-reactive functionality such as an isocyanate on the molecular or polymeric entity starting material. Synthetic routes for a vinyl ether terminated alcohol, and for a vinyl ether containing urethane oligomers are disclosed in U.S. Pat. Nos. 4,749,807, 4,751,273, and 4,775,732 assigned to Allied Signal, Inc.

These polar vinyl ether compounds can blended with electron acceptor compounds, such as fumarates, maleates, acrylates, and maleimides, for co-polymerization to form cured adhesive compositions for use in a wide variety of applications. Suitable fumarates and maleates are, for example, dioctyl maleate, dibutyl maleate, dioctyl fumarate, dibutyl fumarate. Suitable acrylates are numerous and are commercially available, for example, from Sartomer. Suitable maleimides are easily prepared, for example, according to procedures described in U.S. Pat. Nos. 6,034,194 and 6,034,195 to Dershem.

The inventive polar vinyl ether compounds may be formulated into adhesive, coating, potting or encapsulant compositions, and particularly into compositions for use in electronics applications. The compositions may contain one or more curing agents and conductive or nonconductive fillers, and also stabilizing compounds, adhesion promoters or coupling agents.

In general the adhesive compositions will contain a mixture of the electron donor polar vinyl ether and an electron acceptor. The molar ratio of electron donor to electron acceptor will usually be within the range of 1:2 to 2:1, but other ranges may be suitable for particular end uses. The choice of molar ratio to obtain specific properties in the final cured composition will be within the expertise of one skilled in the art without undue experimentation. The electron donor/acceptor system typically will be present in the adhesive composition at 5 to 30 weight percent for those compositions containing fillers. For compositions that do not contain any fillers, the electron donor/acceptor mixture will be the predominant component.

These compositions may be cured thermally or by radiation. Exemplary curing agents are free-radical initiators and photoinitiators, present in an amount of 0.1% to 10%, preferably 0.1% to 3.0%, by weight of the composition. Preferred free-radical initiators include peroxides, such as butyl peroctoates and dicumyl peroxide, and azo compounds, such as 2,2'-azobis(2-methyl-propanenitrile) and 2,2'-azobis(2-methyl-butanenitrile). A preferred series of photoinitiators is sold under the trademark Irgacure by Ciba Specialty Chemicals. In some formulations, both thermal initiation and photoinitiation may be desirable, for example, the curing process can be started by irradiation, and in a later processing step curing can be completed by the application of heat to accomplish the thermal cure.

In general, these compositions will cure at a temperature within the range of 70° C. to 250° C., and curing will be effected at a time interval within the range of ten seconds to three hours. The time and temperature curing profile of each formulation will vary with the specific electron donor compound and the other components of the formulation; the parameters of a curing profile can be determined by one skilled in the art without undue experimentation.

Exemplary conductive fillers are carbon black, graphite, gold, silver, copper, platinum, palladium, nickel, aluminum, silicon carbide, boron nitride, diamond, and alumina. Exemplary nonconductive fillers are particles of vermiculite, mica, wollastonite, calcium carbonate, titania, sand, glass, fused silica, fumed silica, barium sulfate, and halogenated ethylene polymers, such as tetrafluoroethylene, trifluoroethylene, vinylidene fluoride, vinyl fluoride, vinylidene chloride, and vinyl chloride. When present, fillers typically will be in amounts of 70% to 95% by weight of the formulation.

Exemplary adhesion promoters or coupling agents are silanes, silicate esters, metal acrylates or methacrylates, titanates, and compounds containing a chelating ligand, such as phosphine, mercaptan, and acetoacetate. When present, coupling agents will be in amounts up to 10% by weight, and preferably in amounts of 0.1% to 3.0% percent by weight of the electron donor compounds.

The formulations may contain compounds that lend additional flexibility and toughness to the resultant cured material. Such compounds may be any thermoset or thermoplastic material having a Tg of 150° C. or less, and typically will be a polymeric material, such as, a polyacrylate, poly (butadiene), polyTHF (polymerized tetrahydrofuran), carboxy-terminated butyronitrile rubber and polypropylene glycol. When present, these compounds may be in an amount up to about 15% by weight of the polar vinyl ether compound.

The following examples show representative polar vinyl ether compounds, reactions for their preparation, and adhesive formulations prepared from these compounds. The reaction products were characterized by $^1$H-NMR and FT-IR spectroscopies. The examples are illustrative of the invention and are not intended as a limitation. by conversion to the diisocyanate derivative. $C_{36}$ represents the mixture of isomers of linear and branched alkyl chains having 36 carbon atoms (which result from the dimerization of linoleic and oleic acids).

EXAMPLE 1

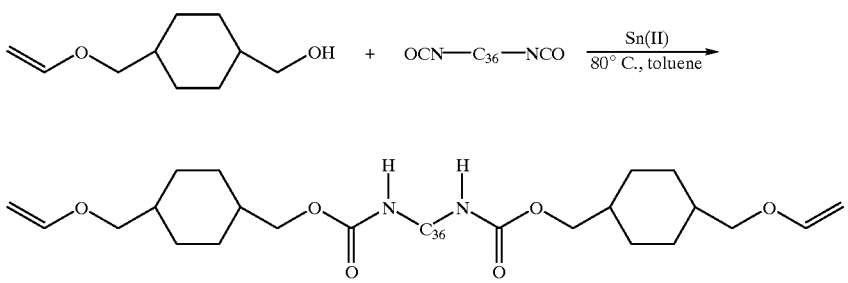

Dimer diisocyanate (Henkel, DDI 1410) (88.36 g. 0.147 mole) was solvated in toluene (300 ml) in a one liter three-necked flask equipped with a mechanical stirrer, addition funnel and nitrogen inlet/outlet. The reaction was placed under nitrogen, and 0.04 g of dibutyltin dilaurate (catalyst) was added with stirring as the solution was heated to 80° C. The addition funnel was charged with 1,4-cyclohexane-dimethanol monovinyl ether (BASF) (50 g, 0.294 mole) dissolved in toluene (50 ml). This solution was added to the isocyanate solution over ten minutes, and the resulting mixture heated for an additional three hours at 80° C. After the reaction was allowed to cool to room temperature, the mixture was washed with distilled water three times. The isolated organic layer was dried over $MgSO_4$, filtered and the solvent removed in vacuo to give the product in 94% yield.

EXAMPLE 2

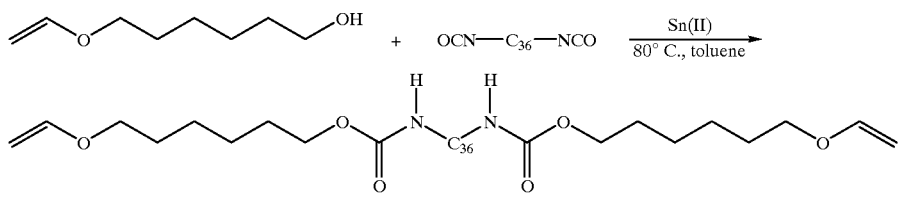

Dimer diisocyanate (Henkel, DDI 1410) (41.7 g, 0.069 mole) was solvated in toluene (100 ml) in a 500 ml three-necked flask equipped with a mechanical stirrer, addition funnel and nitrogen inlet/outlet. The reaction was placed under nitrogen, and 0.03 g of dibutyltin dilaurate (catalyst) was added with stirring as the solution was heated to 80° C. The addition funnel was charged with 1,6-hexanol vinyl ether (BASF) (20 g, 0.139 mole) dissolved in toluene (20 ml). This solution was added to the isocyanate solution over ten minutes, and the resulting mixture heated for an additional three hours at 80° C. After the reaction was allowed to cool to room temperature, the mixture was washed with distilled water three times. The isolated organic layer was dried over $MgSO_4$, filtered and the solvent removed in vacuo to give the product in 97% yield.

EXAMPLE 3

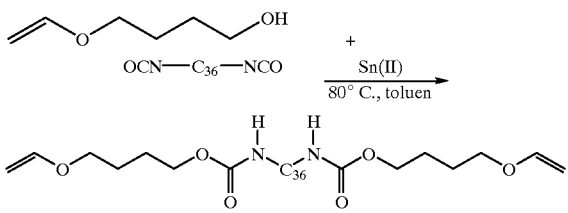

The same reaction was run as in Example 2, using butanol vinyl ether instead of hexanol vinyl ether.

EXAMPLE 4

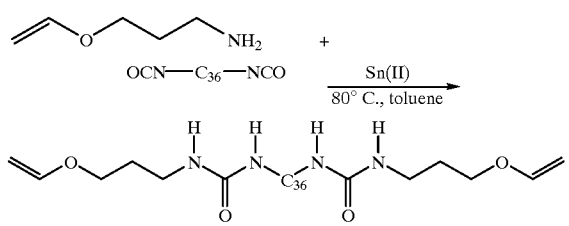

Dimer diisocyanate (Henkel, DDI 1410) (29.74 g, 0.049 mole) was solvated in toluene (200 ml) in a 500 ml three-necked flask equipped with a mechanical stirrer, addition funnel and nitrogen inlet/outlet. The reaction was placed under nitrogen, and the solution heated to 50° C. The addition funnel was charged with 3-amino-1-propanol vinyl ether (Aldrich) (10 g, 0.099 mole) dissolved in toluene (50 ml). This solution was added to the isocyanate solution over ten minutes, and the resulting mixture heated for an additional one hour at 50° C. After the reaction was allowed to cool to room temperature, the mixture was washed with distilled water three times. The isolated organic layer was dried over $MgSO_4$, filtered and the solvent removed in vacuo to give the product in 96% yield.

EXAMPLE 5

This example shows the performance characteristics of vinyl ether compounds containing carbamate functionality formulated into adhesives for use as die attach pastes.

The polar vinyl ether compounds from Examples 1 and 2 and dimer divinyl ether (DDVE),

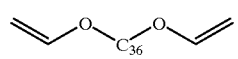

were each reacted with a bismaleimide as the electron acceptor in a one to one molar ratio, using an initiator at 2 weight percent, in a DSC. The bismaleimide had the structure:

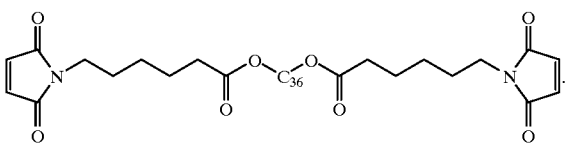

The exotherms per gram for formulations containing the polar vinyl ethers were equal to or higher than that for the DDVE, indicating a similar or larger extent of polymerization. The onset-to-peak temperature range for formulations containing the polar vinyl ethers was also similar to or better than DDVE-based formulations, indicating similar curing kinetics. The results are set out in the following table:

| Die attach paste with vinyl ether from | Onset (° C.) | Peak (° C.) | Onset-to-Peak (° C.) | ΔH (J/g) |
| --- | --- | --- | --- | --- |
| Example 1 | 97.78 | 113.99 | 16.21 | 239.5 |
| Example 2 | 104.87 | 118.52 | 13.65 | 213.4 |
| DDVE | 101.49 | 119.01 | 17.52 | 207.2 |

The vinyl ether compounds from Examples 1 and 2, and dimer divinyl ether were also formulated into die attach adhesive compositions using the same bismaleimide identified above as the electron acceptor in a one to one molar ratio. As will be recognized by the practitioner, other electron acceptors as described in this specification could be substituted for the maleimide.

The die attach adhesive had the following formulation:

| Component | Weight % |
|---|---|
| BisMaleimide (electron acceptor) | 11.19 |
| Vinyl ether (electron donor) | 10.31 |
| Maleic anhydride 8% (Ricon 131) | 2.50 |
| Initiator | 0.50 |
| Blend of adhesion promoters | 0.50 |
| Silver Flakes | 75.0 |

The above three formulations (electron donor from Example 1 and Example 2 and DDVE) were tested for use as die-attach adhesives. Each formulation was divided into two lots, one for testing adhesive strength via die shear at room temperature, and the second for testing die shear at 240° C. An aliquot of adhesive formulation from each lot for each of the three formulations was placed between a 120× 120 mil silicon die and each of a Pd, a Ag, and a Cu lead frame. Each lead frame assembly was placed on a hot plate at 200° C. for about 60 seconds to cure the adhesive. After cure, pressure was applied to the side of the dies at room temperature and at 240° C. until shearing occurred. The die-shear force was measured in Kg. The results are set out in the following table and show that the die shear values for Examples 1 and 2 in which the vinyl ether compounds contain polar functionality show superior adhesive strength at room temperature to that of DDVE, which does not have polar functionality.

| Com- | Room Temp Die Shear | | | 240° C. Die Shear | | |
|---|---|---|---|---|---|---|
| pound | Pd | Ag | Cu | Pd | Ag | Cu |
| Example 1 | 13.2 Kg | 11.1 Kg | 11.7 Kg | 4.4 Kg | 3.8 Kg | 2.8 Kg |
| Example 2 | 10.7 Kg | 8.6 Kg | 9.2 Kg | 4.2 Kg | 3.7 Kg. | 2.5 Kg |
| DDVE | 7.0 Kg | 7.9 Kg | 7.2 Kg | 4.0 Kg | 3.3 Kg | 2.2 Kg |

We claim:

1. An adhesive composition comprising a mixture of a maleimide compound and a vinyl ether compound, in which the vinyl ether compound has the structure

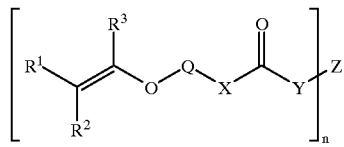

in which n is 1 to 6;

$R^1$, $R^2$, and $R^3$ are hydrogen, methyl or ethyl;

Q is a linear or branched chain alkyl or cycloalkyl having 1 to 12 carbon atoms; an alkylenoxy chain having 1 to 12 carbon atoms, or aromatic or fused aromatic ring having 3 to 10 carbon atoms and optionally containing the heteroatoms O, N or S;

X and Y are independently O, $NR^1$, or S, with the proviso that both X and Y cannot be oxygen or sulfur;

Z is a branched or linear alkane, which may contain cyclic moieties, a siloxane, a polysiloxane, a $C_1$ to $C_4$ alkoxy-terminated siloxane or polysiloxane, a polyether, a polyester, a polyurethane, a poly(butadiene), or an aromatic, polyaromatic, or heteroaromatic group.

2. The adhesive composition according to claim 1 in which for the vinyl ether compound:

$R^1$, $R^2$, and $R^3$ are hydrogen,

Q is a linear or branched chain alkyl or cycloalkyl having 1 to 12 carbon atoms; and Z is a linear or branched chain alkyl having up to 36 carbon atoms.

3. The adhesive composition according to claim 1 in which the vinyl ether compound has the structure:

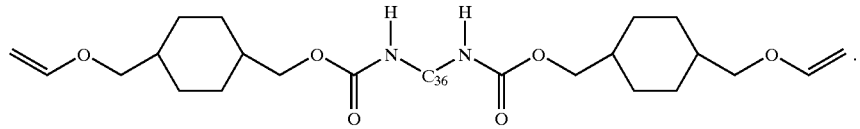

4. The adhesive composition according to claim 1 in which the vinyl ether compound has the structure:

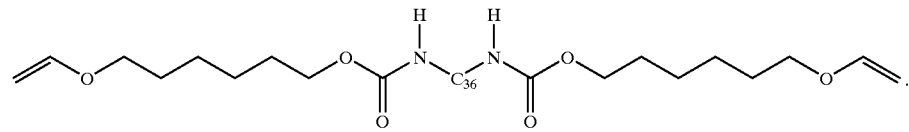

5. The adhesive composition according to claim 1 in which the vinyl ether compound has the structure:

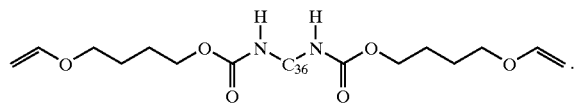

6. The adhesive composition according to claim 1 in which the vinyl ether compound has the structure:

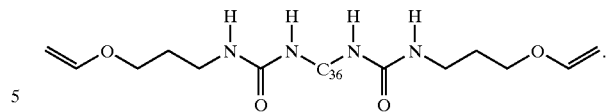

7. The adhesive composition according to claim 1 further comprising a conductive or nonconductive filler.

8. The adhesive composition according to claim 7 in which the filler is silver.

9. The adhesive composition according to claim 7 in which the filler is tetrafluoroethylene.

* * * * *